July 9, 1963 S. W. TEHON 3,097,264

BRANCHING FILTER

Filed May 21, 1957

INVENTOR:
STEPHEN W. TEHON,
BY Richard V. Lang
HIS ATTORNEY.

3,097,264

BRANCHING FILTER

Stephen W. Tehon, Clay, N.Y., assignor to General Electric Company, a corporation of New York Filed May 21, 1957, Ser. No. 660,551
6 Claims. (Cl. 179—1)

The present invention relates to a filter having two output paths and has as an object to provide a new and improved filter in which an applied signal containing a band of frequencies is divided and selected portions of the applied signals are derived at the respective separate output paths.

This type of filtering action, which, we shall denote by the term "branching," has many practical applications. One such application is in a selective call voice communication system in which a plurality of receiving installations are in constant communication with a single source of voice transmissions. In these systems, to conserve the radio spectrum, the transmitter is allocated a single carrier frequency to which all of the receivers are tuned. It is then necessary, if communication with only one receiving station is desired, to provide some means in the transmitted signal for selectively calling the desired station. One method of accomplishing this is to transmit a tone having a frequency lying in the range of modulation frequency band and to which tone only one of the receivers will respond. In such a system the tone is then used to turn on the audio portions of the selected receiving installation. If the tone is transmitted continuously, it is desirable that the tone be filtered from the signal fed to the audio channel.

To perform the functions outlined above, known receiving installations have each required two rather complex filters. One of these filters is required to have a narrow pass band tuned to the tonal frequency assigned to that receiving installation and to be capable of rejecting the tonal frequencies assigned to any other receivers in the system. The other of these filters is required to be capable of providing a notch in the transmission characteristic for eliminating the tone from the sound channel of the selected receiver. Filters employing conventional coil structures, for operation in the preferred range of from 100 to 3500 cycles, have not met the exacting requirements desired. A much more suitable device at these frequencies is an electromechanical filter of the type to be described.

Accordingly, it is another object of the present invention to provide a new and improved filter system employing electromechanical filter elements in which a narrow band portion of an applied broad band signal is delivered to one set of output terminals and the major portion of the applied broad band signal, except for the same narrow band portion, is delivered to a second set of output terminals.

It is another object of the present invention to provide a novel unitary branching filter, in which a single filter provides both for elimination of a tone from a band of transmitted frequencies, at one output and at a separate output, for the selection of this tone alone to the exclusion of all others.

These and other objects of the present invention are achieved by the use with a selective transformer element having an input terminal, and an output terminal exhibiting a phase inversion as to said input terminal, of an impedance connected in shunt between said named terminals. The shunting impedance is chosen to have a value such that its admittance is small relative to that of the transformer at resonance and has a tap thereon such that the admittance from the input terminal measured directly along said shunting impedance to said tap is equal to the negative of the resultant admittance of the path measured directly from said input terminal through said transformer to said tap. When one supplies a broad band signal and a narrow band signal of appropriate frequency to this filter one may then derive from the output terminal of said selective transformer, the selected narrow band signal, and from the tap on the shunting impedance a broad band signal less a portion in close proximity to, or optionally including, said selected narrow band signal.

In accordance with another aspect of the invention, means are provided for reducing the intrinsic impedance of the broad band signal output by coupling the shunting path to a tap on the load impedance coupled to the input of the selective transformer element.

The features of the invention which are believed to be novel are set forth with particularity in the appended claims. The invention, itself, however, both as to its organization and method of operation, together with further objects and advantages thereof, may best be understood by reference to the following description when taken in connection with the drawings, wherein:

Figure 1:
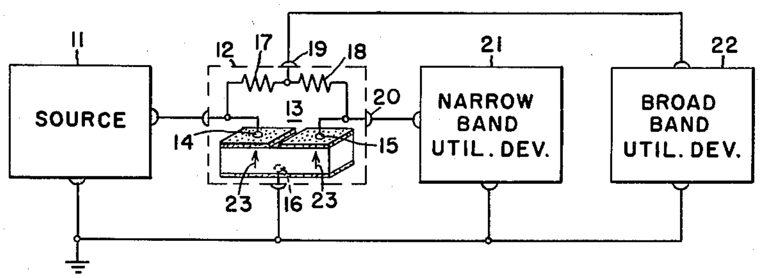
FIGURE 1 illustrates a first embodiment of the invention.

A branching electromechanical filter in accordance with the present invention is illustrated in FIGURE 1. This filter has the property that when a relatively broad band signal is applied to the input terminals of this filter, a narrow portion of the signal is selected at one set of output terminals, while at the second set of output terminals the applied signal is transmitted in its entirety except for a narrow portion of the band slightly to one side of or precisely at the previously selected frequency.

The manner in which the above described branching action may be brought about and a further explanation of the filtering properties of the filter may be had by reference to FIGURE 1. A source of alternating current signals is shown at 11 having one output terminal coupled to ground and the other connected to the input terminal of the branching filter 12. The branching filter 12 comprises an electromechanical transformer 13 having an input terminal 14, an output terminal 15 and a common terminal 16, and a pair of impedance elements 17 and 18. The impedance elements 17 and 18 are connected in series between the transformer terminals 14 and 15, the junction of the impedance elements leading to a first output terminal 19 of the branching filter. The transformer terminal 15 is coupled to the second output terminal 20 of the branching filter. The transformer terminal 16 is coupled to the common terminal of the branching filter and grounded. A narrow band utilization device is shown at 21 coupled respectively between the branching filter output terminal 20 and ground. A broad band utilization device 22 is coupled between the branching filter output terminal 19 and ground.

The electromechanical transformer13 is of the piezoelectric type. It is formed of an elongated bar of rectangular cross-section of piezoelectric material. It is dimensioned to be mechanically resonant in a longitudinal mode at a predetermined operating frequency, at which frequency it presents a relatively narrow pass band. In one illustrative example, the dimensions of the piezoelectric bar were 0.2 by 0.2 by 2.0 inches and the bar was mechanically resonant at a frequency in the vicinity of 42 kilocycles. The material of the bar is a polycrystalline aggregate composed principally of barium titanate and containing a few percent of a calcium titanate and lead titanate. As illustrated by the arrows 23, the bar is polarized in a direction transverse to the major axis of the piezoelectric bar and perpendicular to the planes of the electrodes now to be described.

The transformer electrodes are illustrated in FIGURE 1 as slightly darkened regions coupled respectively to the transformer terminals 14, 15 and 16. These electrodes are composed of a thin coating of silver. The input electrode coupled to the terminal 14 as seen in FIGURE 1, coats the upper surface of the bar on its left portion while the electrode coupled to the output terminal 15 coats the upper surface of the bar on the right portion. The electrode coupled to the common terminal 16 coats the entire bottom of the bar.

The electromechanical transformer functions in the following manner. The electrodes coupled between terminals 13 and 16, are input electrodes adapted to apply an electric field along the axis of polarization of the left portion of the bar. This electric field causes piezoelectric stresses within the bar and initiates mechanical vibrations therein. These vibrations are communicated throughout the bar when the frequency of applied potentials is chosen equal to that at which the bar is resonant. The total excitation of the bar in turn causes mechanical stresses to take place in the right portion of the bar in which portion these stresses are reconverted at the output electrodes into electrical potentials which are inverted in phase with respect to the input potentials by virtue of the foregoing selection of polarization directions.

In general, it may be noted that the complete conversion from an electrical input to an electrical output involves a conversion from electrical to mechanical energy, mechanical coupling between the input portion of the bar and the output portion of the bar, and finally a mechanical to electrical conversion. One may attribute the observed high selectivity of this type of mechanical transformer to the mechanical resonating properties of the bar. One may equivalently represent the selectivity as arising from a series RLC circuit in which the elastic constants of the bar material employed correspond to an equivalent capacity, the mass of the bar corresponds to an equivalent inductance, and the lossy nature of the bar corresponds to an equivalent resistance. These equivalent elements can be treated as forming a series circuit in the path between input and output terminals of the bar. Due to the relatively low loss of the ceramic materials available, the analogous electrical circuit exhibits a relatively high "Q," usually around 300 and often much higher. The response curve illustrated in FIGURE 2 at 24 is typical of the curves exhibited by such devices, and is in fact an experimental curve observed from the piezoelectric transformer illustrated in FIGURE 1. For a more complete description of the piezoelectric transformer, which in itself forms no part of the present invention, and a more complete description of the manner in which electrical transmission occurs, reference may be made to U.S. application, Serial No. 439,992, filed June 29, 1954, on behalf of C. A. Rosen et al. and entitled "Electromechanical Transducer," now Patent No. 2,830,274, and assigned to the same assignee as the present invention.

Figure 2:
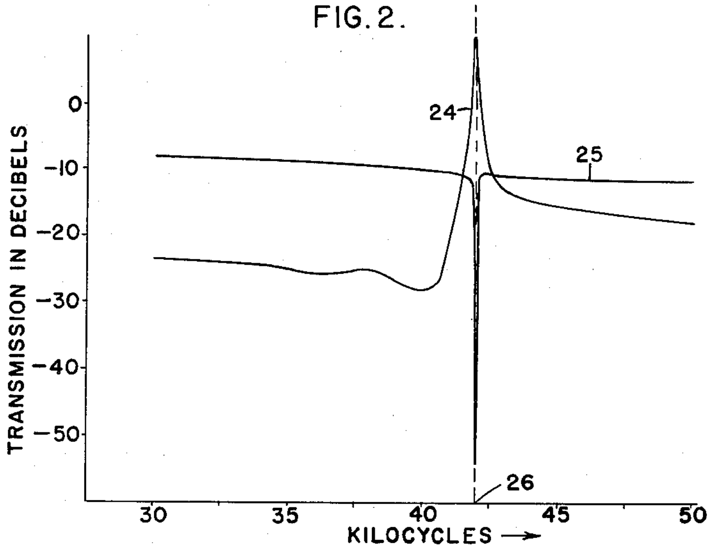
FIGURE 2 is a graph illustrating the transmission characteristics of the first embodiment of the invention, illustrated in FIGURE 1.

Upon the selection of appropriate values for the impedance elements 17 and 18, the branching filter illustrated in FIGURE 1, has been found to exhibit simultaneously the properties illustrated in FIGURE 2. Curve 24 of FIGURE 2 illustrates the transmission versus frequency characteristics of the branching filter as viewed at the output terminal 20 coupled to the narrow band utilization device 21. Curve 25 illustrates the transmission properties of the branching filter as viewed at the output terminal 19 coupled to the utilization device 22. The transmission curve 25 measured at the last mentioned output terminal is essentially flat except in close proximity to the notch frequency 26, thereby permitting relatively complete transmission of a broad band applied signal. At the same time, the curve 24 exhibits substantial attenuation to all signals whose frequencies are removed from the frequency 26, and permits effective transmission to the output terminal 20 of only a narrow band of signals whose frequencies lie in the vicinity of this frequency. It may be further observed that the relative sharpness of the curves as viewed near their respective apices are somewhat different, the rejection band having the very desirable characteristic of being appreciably sharper than the pass band in that region.

The above double transmission characteristic can be attained by proper selection of the values for the impedances 17 and 18 with respect to the properties of the electromechanical transformer and the load devices coupled to the electromechanical transformer. The proper selection is one in which the impedance 17 has a value such that its admittance is equal to the negative of the resultant admittance appearing between terminal 14 of the electromechanical transformer, through the transformer 13, to terminal 19. In the first illustrated practical embodiment of the invention, the impedance 17 was a resistance while the impedance 18 was formed by a resistor and a capacitor in series, the capacitor being required to bring the admittances of the two paths to the terminal 19 into precise phase opposition for complete cancellation at approximately the resonant frequency.

It should be observed that when a null is achieved at the transformer output terminal, as in the embodiment of copending Tehon application, Serial No. 660,694, filed May 21, 1957, now abandoned, and assigned to the General Electric Company, that the presence of a large capacity between the output terminals has little effect on the selection of impedances in the shunt path required to bring about a null. When, however, the transformer is not adjusted to a null at its terminals, as contemplated in the present application, and the null occurs at some point intermediately along the shunt path, the presence of a large capacity at the output terminals affects the admittance of the path through the transformer to the filter terminal 19.

In the first illustrative embodiment, with the transformer 13 as earlier described, the shunting impedance 17 and 18 were formed of an adjustable tap resistance having a value of one megohm, the tap being coupled to the output terminal 19, and one end terminal of the resistance being coupled through a capacitance of approximately 50 micromicrofarads to the transformer terminal 15.

In addition to the above balancing relation, the sum of the impedances in the shunt path should be well above the negative of the transfer impedance of the transformer at resonance to preserve the initial transformer response characteristic as measured at the transformer output terminals.

The above mentioned relations govern the selection of the shunting impedances if a null is desired at the same frequency selected by the transformer. While capacitive elements have been shown, in certain applications inductive elements may be required. Adjustable impedance elements are generally preferred for the purpose of providing system compatibility to different loads. If one wishes to tune out a frequency in the broad band channel different from that selected at the narrow band channel, additional reactance in the shunt path would provide such operation.

Figure 3:
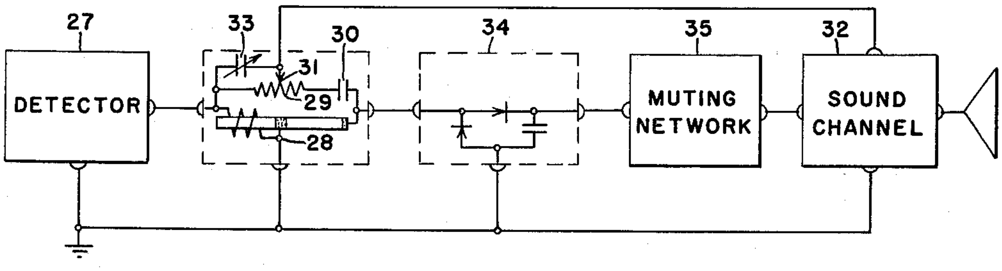
FIGURE 3 is a second embodiment of the invention, applied to a selective call system.

A second embodiment of the invention is illustrated in FIGURE 3. Here the invention has been applied to a selective call system in which a voice or sound signal is derived from the detection stage 27 of a communication receiver and applied to an electromechanical transformer 28 of the ferrite-titanate type having a resonant frequency at approximately 100 cycles per second. The transformer input and output terminals are shunted by a one megohm resistor 29 in series with a 200 micromicrofarad capacitor 30. The resistor 29 is provided with an adjustable tap 31 coupled to the sound channel 32. An adjustable capacitor 33 to 600 micromicrofarads maximum capacity is coupled between the input terminal of the transformer and the tap 31. The output terminal of the transformer is coupled through a voltage doubling, rectifying and filtering circuit 34 to muting network 35, which develops a direct voltage which may be applied to switch on or off the sound channel 32.

The above described embodiment accordingly permits a 100-cycle tone to be transmitted continuously to the muting network without any appreciable interference in the voice transmission band. The band width at the sound channel is observed to be essentially flat throughout the audio region, having merely a short gap of less than a cycle width in the region of 100 cycles.

Figure 4:
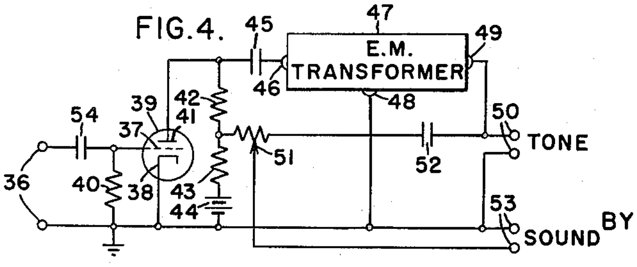
FIGURE 4 is a third embodiment of the present invention in which novel means are shown to reduce the intrinsic impedance of a branching filter at the broad band output terminals. This embodiment may form a portion of a selective call system, such as that illustrated in FIGURE 3.

A third embodiment of the present invention is illustrated in FIGURE 4. It may be substituted into the selective call system shown in FIGURE 3. Here an arrangement is illustrated for effectively reducing the intrinsic impedance presented at the broad band or sound output terminals. The branching filter input terminals 36 are adapted to be connected to a source, such as the detector 27 illustrated in FIGURE 3, containing both the broad band signal and the identifying tone. The terminals 36 are coupled between the grid 37 and cathode 38 of the triode 39 by means of a conventional coupling capacitor 54. The grid is returned to ground by the resistance 40. The anode 41 of the triode 39 is coupled through a first resistance 42 and a second resistance 43, connected in series with the first resistance, to the positive terminal of a source 44 of anode operating potentials. The negative terminal of the source 44 is grounded.

A signal coupling capacitor 45 is coupled between the anode 41 and the input terminal 46 of the electromechanical transformer 47. The electromechanical transformer 47 has a common terminal 48 coupled to ground and an output terminal 49 coupled to one of the tone output terminals 50.

The shunt path from which the broad band signal is derived is provided by the tapped resistor 51 and the capacitor 52. These two elements are coupled in series between the junction of resistances 42 and 43 and the output terminal 49 of the electromechanical transformer 47. The tap on the resistance 51 is coupled to one of the broad band output terminals 53.

This circuit exhibits an output impedance to the broad band signal which is considerably reduced over that of the prior circuit. The circuit provides this function in the following manner. The signals are applied to the triode, and appear in amplified condition at the anode 41, where they are applied across the anode load, consisting of resistance 42 and 43 in series. The tone portion of the signal passes successively through coupling capacitor 45, the electromechanical transformer 47 and thence to the output terminal 50. As to the shunt path carrying the broad band signal, only a portion of that signal is applied to the shunt path; namely that equal to $$\frac{R_{43}}{R_{42}+R_{43}}$$

where $R_{42}$ is the resistance of resistance 43
$R_{43}$ is the resistance of resistance 42

Accordingly, the admittance of the shunt path from anode 41 to transformer terminal 49 is effectively reduced by the same factor, thus permitting the resultant admittance of the elements 51 and 52 to be relatively higher without a corresponding worsening of the "skirt" rejection of the filter as would normally occur.

In practice, the deterioration of the attenuation provided at the narrow band terminals to signals at other than the selected tone frequency is greatest when the shunting admittance is highest. The foregoing measure, accordingly, provides relatively great improvement in the skirt rejection of the filter, assuming given shunting elements.

The intrinsic impedance of the wide band output circuit is determined by the impedance from the junction of resistances 42 and 43 to a point of ground potential, neglecting the path from the tap 51 through capacitor 52, which usually is of higher impedance. Neglecting this factor, the sound channel output impedance thus becomes equal to $$Z_1+\frac{1}{\frac{1}{R_{43}}+\frac{1}{R_{42}+R_T}}$$

where $Z_1$ is the resistance in tapped resistance 51 between the tap and the junction of resistances 42 and 43.
$R_T$ is the plate resistance of the tube.

In practice, if $R_{43}$ is made small relative to $R_{42}$, which is desirable, the second term in the numerator of the fractioned quantity may be neglected leaving $$Z_1+R_{43}$$

as the approximate value of the output impedance. The reduction in impedance in the sound channel, to achieve equal skirt rejection is equal to the ratio $$\frac{R_{42}+R_{43}}{R_{43}}$$

In one practical arrangement, the shunting impedance was reduced by the ratio of 4 to 1 to provide both an improvement in the skirt rejection and in the output impedance upon selection of 11 to 1 for the input load division ratio. The measured sound channel impedance was 2.5 megohms.

The constructive circuit in which these parameters were applied had the following circuit values:

| | |
|---|---|
| Triode 39 | One section of a 12AX7. |
| Resistor 42 | 220,000 ohms. |
| Resistor 43 | 22,000 ohms. |
| Resistor 51 | 2.5 megohms, with tap adjusted near full resistance. |
| Capacitor 52 | 200 micromicrofarads. |

The electromechanical transformer 47 used in this embodiment was a three-terminal bimorphous member comprising two thin slabs of titanate material cemented together and having electrodes fully coating their common faces and opposing faces. Both sections of the member were polarized along the thinnest dimension, and in the same sense, thereby permitting the central electrode to serve as the common terminal and the outer electrodes to serve respectively as phase inverted input and output terminals. The titanate bar was approximately 4 inches long by 0.25 inch wide by 0.030 inch thick. The bar was clamped at its center and vibrated in a simple flexural mode. The bar was weighted at either end with two cylindrical brass weights 5/16 inch long by 1/4 inch in diameter and adjusted to fix resonance at 170 cycles per second.

It should be noted that the audio channel loses somewhat in gain from the tapping connection since it is tapped down to one eleventh of the total triode load. This loss in gain however is easily made up by the preceding triode. The observed tone channel gain is 24 decibels while that of the broad band sound channel is 15 decibels. The tone skirt selectivity was down 38 decibels in the tone channel while the tone notch attenuation was down 34 decibels in the broad band audio channel indicating excellent tone separation.

It should be appreciated that the invention functions admirably with purely magnetostrictive devices, as well as with the purely piezoelectric devices and the mixed magnetostrictive piezoelectric devices illustrated. These devices are generally characterized by higher "Q's" than coil devices in the medium radio frequency and audio frequency ranges and have been applied to frequencies as high as 3 megacycles.

While the illustrative embodiments of the invention have been confined to systems of low radio and audio frequencies in which electromechanical devices have unique advantages in terms of circuit Q's and component sizes over other tuned elements, the invention is of greater scope, applying as well to higher frequencies and to systems employing other types of selective phase inverting devices.

Accordingly, while particular embodiments of the invention have been shown and described, it should be understood that the invention is not limited thereto, and it is intended in the appended claims to claim all such variations as fall in the true spirit of the present invention.

What I claim as new and desire to secure by Letters Patent of the United States is:

1. The combination comprising a selective transformer element tuned to a given frequency having an input terminal and an output terminal exhibiting a phase inversion as to said input terminal, a tapped impedance element coupled between said named terminals, said impedance element having an admittance which is low relative to the transfer admittance of said selective transformer at its tuned frequency for preserving a selective characteristic in said transformer at its output terminal and said tap being so placed that the admittance from said input terminal measured along said element directly to said tap is equal to the negative of the admittance from said input terminal measured directly through said transformer to said tap near said tuned frequency, means for applying signals to said transformer input terminal, a load coupled to said transformer output terminal deriving a selected narrow band signal, and means coupled to said tap for deriving a broad band signal less a portion near said tuned frequency.

2. The combination set forth in claim 1 wherein said selective transformer is an electromechanical transformer, mechanically resonant in the range of frequencies including audio and low radio frequencies.

3. The combination set forth in claim 1 wherein said selective transformer is a piezoelectric transformer, and said impedance element comprises a tapped resistance and a capacitance, the latter being coupled between said tap and said transformer output terminal.

4. The branching network set forth in claim 1 further comprising a voltage muted sound channel having muting terminals and input terminals for connection to a source of broad band electric signals of audio frequencies, and wherein said selective transformer is an electromechanical transformer having a tuned frequency lying in said broad band, said load deriving a narrow band signal is coupled to said muting terminals, and said means for deriving a broad band signal are coupled to said input terminals for said broad band electric signals.

5. A branching network comprising a pair of input terminals for connection to a source of signals, a tapped load impedance coupled between said input terminals, a selective transformer tuned to a given frequency having an input terminal and an output terminal exhibiting a phase inversion as to said input terminal, said transformer input terminal being coupled to a first one of said network input terminals, a tapped shunting impedance coupled between the tap on said load impedance and the output terminal of said selective transformer, the effective admittance presented by said shunt path to signals in the path from said first network input terminal to said transformer output terminal is low relative to the transfer admittance of said selective transformer at its tuned frequency for preserving a selective characteristic in said transformer at its output terminal, the tap on said shunting impedance being so placed that the effective admittance from said first network input terminal measured directly through a portion of said load impedance to the tap in said shunting impedance is equal to the negative of the admittance from said first network input terminal, measured directly through said transformer to said tap on said shunting impedance at the tuned frequency of said transformer, a load coupled to said transformer output terminal deriving a selected narrow band signal, and means coupled to said tap on said impedance for deriving a broad band signal less a portion near said narrow band signal frequency.

6. The branching network set forth in claim 5 further comprising a voltage muted sound channel having muting terminals and input terminals for connection to a source of broad band electrical signals of audio frequency, and wherein said selective transformer is an electromechanical transformer having a tuned frequency lying in said broad band, said load deriving a narrow band signal is coupled to said muting terminals, and said means for deriving a broad band signal are coupled to said input terminals for said broad band electric signals.

References Cited in the file of this patent

UNITED STATES PATENTS

| | | |
|---|---|---|
| 2,085,953 | Cauer | July 6, 1937 |
| 2,248,746 | Davis | July 8, 1941 |
| 2,308,379 | Starr | Jan. 12, 1943 |
| 2,524,781 | Epstein | Oct. 10, 1950 |
| 2,760,011 | Berry | Aug. 21, 1956 |
| 2,830,204 | Harris | Apr. 8, 1958 |